United States Patent
Bareiss et al.

(10) Patent No.: US 11,912,101 B2
(45) Date of Patent: Feb. 27, 2024

(54) AIR-CONDITIONING DEVICE FOR A MOTOR VEHICLE, IN PARTICULAR FOR A CAR, AND MOTOR VEHICLE

(71) Applicant: Daimler AG, Stuttgart (DE)

(72) Inventors: Mario Bareiss, Moerlenbach (DE); Thomas Frey, Kaiserslautern (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 463 days.

(21) Appl. No.: 17/296,870

(22) PCT Filed: Nov. 25, 2019

(86) PCT No.: PCT/EP2019/082356
§ 371 (c)(1),
(2) Date: May 25, 2021

(87) PCT Pub. No.: WO2020/109201
PCT Pub. Date: Jun. 4, 2020

(65) Prior Publication Data
US 2022/0348053 A1    Nov. 3, 2022

(30) Foreign Application Priority Data
Nov. 26, 2018  (DE) ............... 10 2018 009 269.1

(51) Int. Cl.
*B60H 1/00*    (2006.01)
*B60H 1/14*    (2006.01)

(52) U.S. Cl.
CPC ..... *B60H 1/00385* (2013.01); *B60H 1/00885* (2013.01); *B60H 1/143* (2013.01)

(58) Field of Classification Search
CPC ............. B60H 1/00385; B60H 1/00885; B60H 1/143; B60H 1/004; B60H 1/034
See application file for complete search history.

(56) References Cited

U.S. PATENT DOCUMENTS

| 8,769,977 B2 | 7/2014 | Renner et al. |
| 2008/0028768 A1 | 2/2008 | Goenka |

(Continued)

FOREIGN PATENT DOCUMENTS

| DE | 197 55 193 A1 | 6/1998 |
| DE | 198 14 581 A1 | 10/1999 |

(Continued)

OTHER PUBLICATIONS

PCT/EP2019/082356, International Search Report dated Mar. 11, 2020 (Two (2) pages).

(Continued)

*Primary Examiner* — Marc E Norman
(74) *Attorney, Agent, or Firm* — Crowell & Moring LLP (57) ABSTRACT

An air-conditioning device includes a first circuit and a second circuit. Air supplied to an interior chamber of a motor vehicle flows through an air pathway. A first heat exchanger is disposed in the air pathway where the air flowing through the air pathway is heatable by the first heat exchanger. A second heat exchanger is disposed downstream of the first heat exchanger where the air flowing through the air pathway is heatable by the second heat exchanger. A valve device has a first switching state in which the first heat exchanger is disposed in the first circuit and the second heat exchanger is disposed in the second circuit and a second switching state in which the first heat exchanger is disposed in the second circuit and the second heat exchanger is disposed in the first circuit.

10 Claims, 2 Drawing Sheets

(56) References Cited

U.S. PATENT DOCUMENTS

| | | | |
|---|---|---|---|
| 2010/0287979 A1 | 11/2010 | Haller et al. | |
| 2012/0247716 A1 | 10/2012 | Galtz et al. | |
| 2016/0061461 A1* | 3/2016 | Ito | F24F 3/1429 |
| | | | 62/277 |
| 2020/0254848 A1* | 8/2020 | Semel | F25D 21/006 |

FOREIGN PATENT DOCUMENTS

| | | |
|---|---|---|
| DE | 10 2009 059 237 B4 | 6/2011 |
| DE | 10 2014 203 895 A1 | 9/2015 |
| FR | 2 843 074 A1 | 2/2004 |

OTHER PUBLICATIONS

German-language German Office Action issued in German application No. 10 2018 009 269.1 dated Dec. 4, 2019 (Five (5) pages).

* cited by examiner

AIR-CONDITIONING DEVICE FOR A MOTOR VEHICLE, IN PARTICULAR FOR A CAR, AND MOTOR VEHICLE

BACKGROUND AND SUMMARY OF THE INVENTION

The invention relates to an air-conditioning device for a motor vehicle, in particular for a car. Moreover, the invention relates to a motor vehicle, in particular a car.

Such an air-conditioning device for a motor vehicle is already known from DE 10 2009 059 237 B4. The air-conditioning device has a first circuit that a medium can flow through, in which circuit at least one first component is arranged. The medium flowing through the first circuit can at least be heated up by means of the first component. Moreover, the air-conditioning device has a second circuit that a medium can flow through, in which circuit at least one second component is arranged. The medium flowing through the second circuit can at least be heated up by means of the second component. Furthermore, an air pathway is provided, which air to be supplied from the interior chamber of the motor vehicle can flow through. Moreover, the air-conditioning device has a first heat exchanger that is arranged in the air pathway and that can be flowed around by the air flowing through the air pathway, by means of which heat exchanger the air flowing through the air pathway can at least be heated up. Moreover, a second heat exchanger that is arranged in the air pathway and that can be flowed around by the air flowing through the air pathway is provided, which heat exchanger is arranged downstream of the first heat exchanger. The air flowing through the air pathway can at least be heated up by means of the second heat exchanger.

Moreover, the air-conditioning device has a valve device, by means of which at least one current, flowing through the respective circuit, of the respective medium can be influenced or set.

An object of the present invention is to develop an air-conditioning device and a motor vehicle of the kind specified above in such a way that the interior chamber of the motor vehicle can be air-conditioned particularly efficiently and in line with demand.

In order to develop an air-conditioning device of the kind specified herein in such a way that the interior chamber of the motor vehicle can be air-conditioned particularly efficiently and in line with demand, i.e., in particular can be cooled and/or heated, it is provided according to the invention that the valve device has at least one first switching state and at least one second switching state different from the first switching state. This means that the valve device can be switched between the first switching state and the second switching state. In the first switching state, the first heat exchanger is arranged in the first circuit, and in the second switching state, the second heat exchanger is arranged in the second circuit.

The medium flowing through the first circuit is also referred to as the first medium, and the medium flowing through the second circuit is also referred to as the second medium. The respective medium is preferably a fluid. The media can be the same. In particular, the respective medium can be formed as a liquid, which at least comprises water. In particular, it is conceivable that the respective medium is formed at least virtually completely from water. Thus, the respective medium, for example, can comprise at least virtually exclusively water. In the first switching state, the first medium is guided by means of the valve device in such a way that the first medium, which can at least be heated up by means of the first component of the motor vehicle, flows through the first heat exchanger. Thus, the first medium, for example, which is or has been heated up by means of the first component, can be cooled by means of the first heat exchanger, in particular in such a way that the first medium emits heat via the first heat exchanger, which passes from the first medium via the first heat exchanger to the air flowing around the first heat exchanger. Moreover, in the first switching state, the valve device causes the second medium, which at least can be heated or is heated by means of the second component, to flow through the second heat exchanger. In other words, in the first switching state, the second medium is guided in such a way that it is heated up by means of the second component and flows through the second heat exchanger. Thus, the second medium, for example, which is heated up or has been heated up by means of the second component, is cooled by means of the second heat exchanger, in particular in such a way that a heat transfer is carried out from the second medium flowing through the second heat exchanger via the second heat exchanger to the air flowing around the second heat exchanger. Preferably, it is provided that the circuits formed, for example, as liquid circuits, in particular as water circuits, are separated from one another in the first switching state by means of the valve device, such that the media are not mixed together.

In the second switching state, the first heat exchanger is arranged in the second circuit and the second heat exchanger is arranged in the first circuit. This means that, in the second switching state, the valve device causes such a flow of the first medium that the first medium, which can be heated up or is heated up by means of the first component, flows through the second heat exchanger. Thus, for example in the second switching state, for example, the first medium is cooled by means of the second heat exchanger by a heat transfer, for example, being carried out from the first medium flowing through the second heat exchanger via the second heat exchanger to the air flowing around the second heat exchanger. Moreover, for example, in the second switching state, the valve device causes such a flow of the second medium that the second medium, which at least can be heated up or is heated up by means of the second component, flows through the first heat exchanger. Thus, for example, the second medium is cooled by means of the first heat exchanger, in particular in such a way that a heat transfer is carried out from the second medium flowing through the first heat exchanger via the first heat exchanger to the air flowing around the first heat exchanger.

In the first switching state and in the second switching state, a pre-warming or pre-heating of the air flowing around the heat exchangers is carried out, for example, by means of the first heat exchanger, in particular in such a way that the air is heated up by means of the first heat exchanger from a first temperature to a higher second temperature in relation to the first temperature. After this, a higher third temperature in relation to the second temperature in the form of a target temperature is set, for example by means of the second heat exchanger, in particular in such a way that the air is heated up by means of the second heat exchanger and thus brought from the second temperature to the higher third temperature in relation to the second temperature (target temperature). In the first switching state, the first medium is used to pre-heat the air or to bring it to the second temperature, and the second medium is used to heat up the air to the third temperature. In the first switching state, the second medium thus has a higher temperature or a higher temperature level than the first medium or the first switching state is set, in particular, when the second medium has a higher temperature or a higher temperature level than the first medium.

However, in the second switching state, the second medium is used to pre-heat the air via the first heat exchanger, and, in the second switching state, the first medium is used to further heat the air to the third temperature. Thus, in the second switching state, the first medium has a higher temperature or a higher temperature level than the second medium or the second switching state is set, in particular, when the first medium has a higher temperature or a higher temperature level than the second medium.

As a result of the switching states or as a result of setting the respective switching states, the second heat exchanger can function both in the first switching state and in the second switching state at a higher temperature level than the first heat exchanger, since, both in the first switching state and in the second switching state, the first heat exchanger is used to pre-heat the air and the second heat exchanger is used to set the third temperature. As a result, a particularly energy-efficient and effective air-conditioning, in particular heating, of the interior chamber can be implemented with a particularly high degree of effectiveness.

The following knowledge underpins the invention: with conventional motor vehicles, which each have at least or exactly one internal combustion engine, formed, for example, as a diesel engine, for driving the respective motor vehicle, it is usually provided to couple a heating circuit for heating up the respective interior chamber of the respective motor vehicle with a cooling circuit for cooling the internal combustion engine. A heating medium, which is used to heat up the interior chamber, is thus used to cool the internal combustion engine. To do so, a heat transfer is carried out from the internal combustion engine to the heating medium, which is thus heated up. By means of the heated heating medium, air can be heated up which here constantly has a high temperature level of about 80° C. The lost heat of the internal combustion engine that is already available and thus free of charge is thus used to heat the interior chamber, also referred to as the passenger chamber.

In hybrid- or, in particular, electric vehicles, such a large amount of lost heat, i.e., lost heat at such a high temperature level, is no longer available, since an internal combustion engine is not provided or since a potentially provided internal combustion engine is operated only rarely, and thus the heating medium cannot be heated up or heated up only slightly.

However, a plurality of circuits can be provided, which function at different temperature levels, wherein in each case at least one or more components are integrated into these circuits, the components being cooled by means of a fluid flowing through the respective circuit and, as a result, being able to feed a high amount of lost heat into the respective circuit. Often, however, the temperature level is so low that conventional solutions, in particular conventional heat exchangers, cannot be used, in order to be able to sufficiently heat the passenger chamber in light of the low temperature level.

The invention now makes it possible to use lost heat of the components with different temperature levels. In the first switching state, the second component, for example, has a higher temperature level than the first component, such that the second component can heat the second medium more intensely than the first component can heat the first medium. Thus, if the second component, for example, functions at a higher temperature level than the first component, then the first switching state is set, in order to pre-heat the air by means of the first medium via the first heat exchanger and to be able to bring it to the third temperature by means of the second medium via the second heat exchanger.

In contrast, however, if the first component functions at a higher temperature level than the second component, such that the first medium can be heated up more intensely by means of the first component than the second medium can be heated up by means of the second component, then the second switching state is set. In doing so, the air can be pre-heated by means of the second medium via the first heat exchanger and can be brought to the third temperature by means of the first medium via the second heat exchanger. Expressed again in other words, the invention makes it possible to selectively incorporate the heat exchangers into the circuits in line according to demand, such that the interior chamber can be heated up effectively and in line with demand, although the components can function on different temperature levels, for example, and although the respective temperature level of the respective component can vary, in particular depending on its operating state.

One of the circuits is, for example, a battery cooling circuit for cooling a battery, in particular formed as a high-voltage battery (HV battery), of the motor vehicle, such that one of the components, for example, is formed as the so-called battery. The battery cooling circuit or its medium has, for example, a temperature or a temperature level of 25° C. The other circuit can here be formed, for example, as a low-temperature circuit, the medium of which, for example, has a temperature of 0° C. The idea underlying the invention is thus to reasonably crosslink the circuits. To do so, the valve device can be selectively switched between the switching states in line with demand.

As already indicated, it is preferably provided that the circuits are separated from one another both in the first switching state and in the second switching state, such that the media do not mix together. However, a third switching state of the valve device is also conceivable, wherein, in the third switching state, the circuits are fluidically connected to one another and can thus form a whole circuit. Thus, the media mix together, for example, and thus form a whole medium, which flows or can flow through the whole circuit.

Since the heat exchangers are arranged consecutively or one behind the other in the current direction of the air flowing through the air pathway, wherein the first heat exchanger is arranged upstream of the second heat exchanger or the second heat exchanger is arranged downstream of the first heat exchanger, an incremental increase of the temperature or temperature level of the air is provided. In the present case, the air is used as a heat-transferring medium in order to heat up the interior chamber. To do so, the air pathway, for example, opens out into the interior chamber via at least one or more air diffusers, such that the air flowing through the air pathway can flow through the air diffuser and, in doing so, can flow into the interior chamber.

The valve device enables a respective switch of the circuits, such that amounts of lost heat provided by the components and fed into the circuits can be used as well as possible in order to air-condition the air and thus the interior chamber, in particular to heat them up.

The feature that the respective medium or the air is at least heatable, i.e., can at least be heated up, can be understood to mean that it can additionally be provided, for example, that the respective medium can be cooled by means of the respective component or that the air can also be cooled by means of the respective heat exchanger, for example, in particular by means of the first heat exchanger.

Since the respective component is at least formed to heat up the respective medium, in an operating state of the respective component, the respective component is a heat source. The respective medium can be heated up by means of the respective component, for example, in such a way that an at least mediate or indirect heat transfer from the respective component to the respective medium is carried out. Here, it can be provided that the medium flows through the respective component, such that a direct or indirect heat transfer, for example, is carried out from the component into the medium. In other words, the respective component is formed to provide lost heat, by means of which the respective medium can be heated up. Furthermore, it is conceivable that an intermediary medium is provided. Here, for example at least one heat transducer is provided which the intermediary medium and the respective medium can flow through. The intermediary medium can be heated, for example, by means of the respective component, in particular in such a way that the intermediary medium can flow through the respective component. In doing so, an at least indirect, in particular direct, heat transfer can be carried out from the respective component to the intermediary medium. For example, a heat transfer can be carried out via the heat transducer from the respective intermediary medium to the respective medium, whereby the intermediary medium is cooled and the respective medium is heated up. Subsequently, the medium, for example, can flow through the respective heat exchanger, in particular depending on the switching state of the valve device. By warming or heating up the intermediary medium or the medium, for example, the respective component is cooled.

Using the knowledge of the necessary and present amount of heat and the temperature level, one of the heat sources, for example, can be prioritized for a certain heat sink. Such a heat sink can be a component which uses the lost heat provided by the heat source. For example, the respective heat exchanger can be such a heat sink. Inactive circuits, i.e., those circuits which are used only temporarily, for example, and in particular only in summer, and/or parts of such inactive circuits are used, for example, in order to transport heat to locations or to where it is required.

In particular, by means of the air-conditioning device according to the invention, the following advantages can be implemented:

better degree of effectiveness
better efficiency (energy consumption)
long range for electric vehicles
saving additional components for heating and/or cooling
heating and/or cooling, in particular the interior chamber, via a medium Since the circuits are fluidically separated from one another both in the first switching state and in the second switching state, the circuits are decoupled from one another, for example both in the first switching state and in the second switching state. As indicated above, the third switching state can be provided in which the circuits, for example, are fluidically connected to one another and thus coupled to one another. The valve device thus makes possible a coupling and decoupling of the several circuits, formed as water circuits, for example, in line with demand, in order to also use lost heat of the components for air-conditioning, in particular for heating, the interior chamber when the components function or run on only low temperature levels and thus provide only a small amount of lost heat.

Preferably, the air-conditioning device has at least one conveying device, by means of which the media can be conveyed through the respective circuits. For example, the pump device has a first pump arranged in the first circuit for conveying the first medium and a second pump arranged in the second circuit for conveying the second medium. Thus, the first medium can be conveyed through the first circuit by means of the first pump and/or the second medium can be conveyed through the second circuit by means of the second pump. For example, the circuits can be coupled and decoupled from one another by means of the valve device and by means of the pump device. Here, it is conceivable that the valve device has several valve elements that the media can flow through and that are formed as directional valves.

A coupling of the circuits is carried out, for example, via the air as the heat-transferring medium, in such a way that the air can be heated up via the heat exchanger both by means of the first medium and thus by means of the first circuit and by means of the second medium and thus by means of the second circuit.

Here, the valve device is formed to influence the respective medium or its respective current at least with respect to a respective flow direction of the respective medium, in particular to set it in line with demand. Thus, for example in the first switching state, such a flow direction of the first medium and such a flow direction of the second medium is set or causes, by means of the valve device, the first medium to flow through the first heat exchanger and the second medium to flow through the second heat exchanger. In the second switching state, such a current or flow direction of the first medium and the second medium is set by the valve device or causes the first medium to flow through the second heat exchanger and the second medium to flow through the first heat exchanger.

Here, it has also been shown to be advantageous when the valve device is also formed to set, i.e., to vary, a respective mass and/or volume flow of the respective current or the respective medium. Thus, by means of the valve device, for example, a first mass and/or volume flow, flowing through the first heat exchanger, of the respective medium and a second mass and/or volume flow, flowing through the second heat exchanger, of the respective medium is set, such that the temperature of the air, for example, and thus a temperature prevalent in the interior chamber of the passenger vehicle can be set specifically and in line with demand.

A further embodiment is characterised in that the air-conditioning device has at least one cooling device provided in addition to the heat exchangers and in addition to the components, by means of which cooling device at least one of the media, and in particular here both media, depending on the switching state of the valve device, can be cooled. Here, the air flowing through the air pathway is to be cooled by means of the medium cooled by means of the cooling device in at least one of the switching states of the valve device via at least one of the heat exchangers. For example, in at least one of the switching states, the air flowing through the air pathway can be cooled via the first heat exchanger and thus by means of the medium flowing through the first heat exchanger in the at least one switching state, whereby the interior chamber can be air-conditioned and, in particular, cooled effectively and efficiently. To cool the air, a heat transfer from the air flowing through the air pathway and flowing around the at least one heat exchanger to the medium flowing through the at least one heat exchanger is carried out via the at least one heat exchanger.

The cooling device can be a compression refrigerating machine, by means of which the at least one medium, for example, can be cooled, in particular by using a refrigerant. In particular, the cooling device can be a heat pump, which is formed, for example, to remove heat from the at least one medium, whereby the at least one medium is cooled. The heat removed from the at least one medium can be used, for example, for at least one or more heating purposes, wherein the heat removed from the at least one medium can be used, for example, in order to heat up the battery mentioned above or an energy store, formed for storing electrical energy, of the motor vehicle in line with demand.

In a particularly advantageous embodiment of the invention, it is provided that at least one of the components is an electrical, in particular electronic, component, by means of which the motor vehicle can be electrically driven. The motor vehicle is thus preferably formed as a hybrid or electric vehicle, in particular as a battery electric vehicle (BEV). In its completely produced state, the motor vehicle thus has the air-conditioning device and the electrical component, by means of which the motor vehicle can be electrically driven. By means of the cooling, described above, of the electrical components, excessive temperature of the electrical components can be avoided. Otherwise unused lost heat of the components can be used in order to efficiently and effectively heat up the interior chamber.

Here, it has proved to be particularly advantageous when the electrical component comprises at least one electrical engine for electrically driving the motor vehicle. The electrical engine can thus be operated, for example, in an engine operation and thus as an electrical engine, by means of which the motor vehicle can be electrically driven. In order to operate the electrical engine in the engine operation, the electrical engine is supplied with electrical energy or electrical current, which is stored in the energy store mentioned above. The energy store and/or the electrical engine is preferably formed as a high-voltage component, the electrical voltage, in particular electrical operating voltage, of which is greater than 12V and preferably at least 48V or greater than 48V, in particular greater than 50V. Preferably, the electrical voltage, in particular the electrical operating voltage, is several hundred volts (V). In doing so, particularly large electrical outputs can be implemented for driving the motor vehicle. As indicated above, the energy store can be the battery, in particular high-voltage battery, mentioned above.

Furthermore, it is conceivable that the component comprises the energy store formed for storing electrical energy and/or at least one power electronics system. The power electronics system can comprise a current converter. Via the power electronics system, the electrical engine mentioned above can be supplied with electrical energy, which is stored, for example, in the energy store and is provided by the energy store. Alternatively or additionally, the electrical, in particular electronic, component can have at least one fuel cell, in particular a fuel cell stack. By means of the fuel cell, for example using water and hydrogen, electrical energy can be provided, which can be supplied to the electrical engine and/or the energy store, in order to store the electrical energy provided by the fuel cell in the energy store and/or to use it to implement the engine operation of the electrical engine.

In a particularly advantageous embodiment of the invention, the air-conditioning device is formed to heat up the energy store formed for storing electrical energy by means of at least one of the media. Thus, the energy store, for example, can be used as a cooling element, by means of which the at least one medium or the at least one medium mentioned above can be cooled. In doing so, the at least one medium is cooled. The cooled medium can be used, for example, in order to cool, in particular via the at least one heat exchanger and here, for example, via the first heat exchanger, the air flowing through the air pathway.

In a particularly advantageous embodiment of the invention, the air-conditioning device comprises at least one heat pump, which is formed to remove heat from the ambient air surrounding the air-conditioning device, and to heat up at least one of the media by means of the removed heat. The medium heated up by means of the removed heat can then be used, for example, in order to heat up the energy store. The heat pump is, for example, a combined water and air heat pump, which can provide heat in the at least one medium formed, for example, as water or at least having water on different temperature levels with different outputs. If the at least one medium, for example, initially has a low temperature level, then the heat pump is operated with a high output, in order to heat up the at least one medium. If the at least one medium, for example, already has a high temperature level, then the heat pump is operated with a lower output, since the at least one medium is still heated up yet is not longer to be heated up too greatly.

The electrical, in particular electronic, component is also referred to as the electric component, wherein, for example, the circuit in which the electric component is arranged is a low-temperature circuit or the low-temperature circuit mentioned above.

The fuel cell can provide, for example, a maximum flow temperature, in particular water flow temperature, of around 68° C., such that the fuel cell, for example, can heat up the medium flowing through the circuit in which the fuel cell is arranged to a temperature of a maximum of 68° C. In particular, the fuel cell can heat up the respective medium with a high heating output, which depends on the operating strategy for operating the air-conditioning device or the motor vehicle overall.

A further embodiment is characterised in that at least one electrical heating element is provided, by means of which at least one of the media can be heated up by using electrical energy. The at least one electrical heating element is thus arranged in one of the circuits.

A further embodiment is characterised by at least one additional heating device, by means of which at least one of the media can be heated up by using at least one fossil fuel. To do so, for example, the fossil fuel is combusted, whereby the at least one medium is heated up.

In a first operating state, the energy store can be heated up and, in a second operating state different from the first operating state, can be cooled, in particular by means of the air-conditioning device or by means of at least one of the media. Furthermore, several heating devices are conceivable which have different flow temperature requirements and output requirements.

For example, heat can be efficiently provided via the first heat exchanger on a moderate temperature level and with a high output, and the desired or maximum temperature level of the fuel cell can be utilised via the second heat exchanger and only a little energy can be removed from this circuit. The temperature level can here even be raised again by the electrical heating device and/or by the additional heating device, before it reaches the respective heat exchanger, in particular the second heat exchanger.

Yet, vice versa, in a different case, the lost heat of the fuel cell can be used via the heat exchanger, and the target temperature and the target output can be achieved via the second heat exchanger, which is then stored via the heat pump and additionally can also be supported by the electrical heating device. This is only possible as a result of a change of the flow direction, at least in parts of the circuits.

To cool the battery and to heat the battery, depending on the case, the flow direction is also set or changed by means of the valve device.

A motor vehicle, preferably formed as a car, in particular as a passenger vehicle, also belongs to the invention, which has at least one air-conditioning device according to the invention. Advantages and advantageous designs of the air-conditioning device according to the invention are to be seen as advantages and advantageous designs of the motor vehicle according to the invention and vice versa.

It has been shown to be particularly advantageous when the motor vehicle according to the invention is formed as a commercial vehicle, in particular as a bus or an omnibus. Thus, the large or large-volume interior chamber can be efficiently tempered, in particular cooled and/or heated up.

Further advantages, features and details of the invention emerge from the description below of preferred exemplary embodiments and by means of the drawings. The features mentioned above in the description and feature combinations and the features mentioned below in the description of the figures and/or shown in the figures alone and feature combinations can not only be used in the respectively specified combination, but also in other combinations or on their own without leaving the scope of the invention.

DETAILED DESCRIPTION OF THE DRAWINGS

In the figures, the same or functionally identical elements are provided with the same reference numerals.

Figure 1:
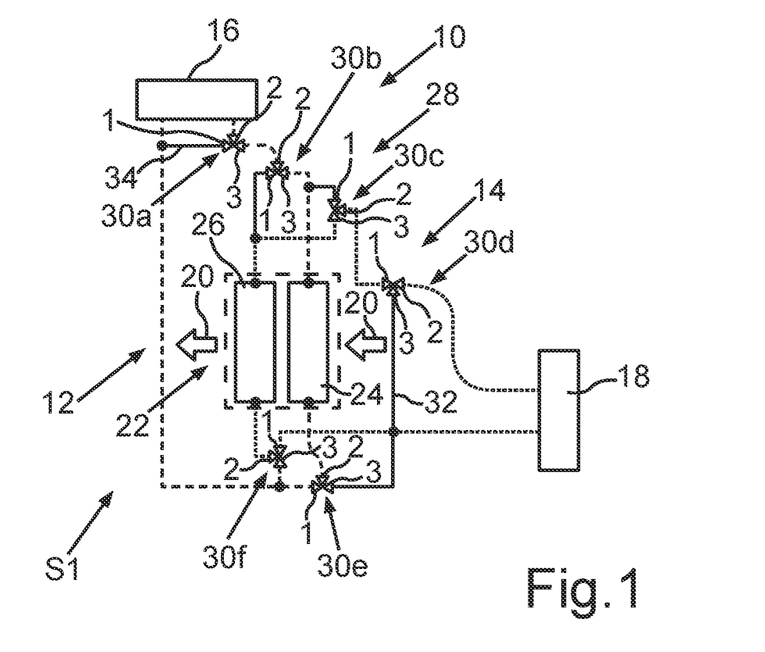
FIG. 1 is a schematic depiction of an air-conditioning device according to the invention, wherein a valve device of the air-conditioning device assumes a first switching state.

In a schematic depiction, FIG. 1 shows an air-conditioning device 10 for a motor vehicle, preferably formed as a commercial vehicle. The motor vehicle is formed, for example, as a bus, in particular as an omnibus. The motor vehicle is formed, for example, as an electric or hybrid vehicle and thus, in its completely produced state, comprises at least one electrical engine, by means of which the motor vehicle can be electrically driven. Moreover, in its completely produced state, the motor vehicle has at least one energy store formed for storing electrical energy, which can be formed as a battery, in particular as a high-voltage battery.

The air-conditioning device 10 has a first circuit 12 which a first medium can flow through and a second circuit 14 which a second medium can flow through. A first component 16 of the motor vehicle is arranged in the first circuit 12, wherein the first medium flowing through the circuit 12 can at least be heated up by means of the first component 16. Thus, the first component 16 can function or work as a first heat source for heating the first medium.

At least one second component 18 of the motor vehicle is arranged in the second circuit 14, wherein the second medium flowing through the second circuit 14 can at least be heated up by means of the second component 18. Thus, the second component 18 can work or function as a second heat source. The respective medium can flow through the respective component 16 or 18, for example, such that an at least indirect, in particular direct, heat transfer can be carried out, as part of which heat is transferred at least indirectly, in particular directly, from the respective component 16 or 18 to the respective medium. In doing so, the respective component 16 or 18, for example, is cooled and the respective medium is heated up.

The respective medium is preferably a liquid that flows through the respective circuit 12 or 14 in the liquid state. In particular, the medium can have at least or exclusively water, such that the medium is also referred to as water. Since the respective heat source is cooled when heating up the respective medium, the respective medium functions, for example, as a cooling medium, in particular as a cooling liquid or as cooling water.

Moreover, the air-conditioning device 10 has an air pathway 22 illustrated by arrows 20 in FIG. 1, which is flowed through by air supplied to the interior chamber of the motor vehicle. Here, the arrows 20 illustrate a current of the air flowing through the air pathway 22, which is supplied, for example, to the interior chamber, i.e., introduced into the interior chamber. The air-conditioning device 10 comprises, for example, at least one fan that cannot be seen in the figures, by means of which the air is conveyed through the air pathway 22. The air pathway 22 opens out, for example, via at least one air vent or via several air vents into the interior chamber, such that the air flowing through the air pathway 22 can flow through the respective air vent. In doing so, the air flowing through the air pathway 22 is introduced into an interior chamber.

Moreover, the air-conditioning device 10 has a first heat exchanger 24 and a second heat exchanger 26. The heat exchangers 24 and 26 are arranged in the air pathway 22 and correspondingly can be flowed around by the air flowing through the air pathway 22. In the current direction of the air flowing through the air pathway 22, the heat exchanger 26 is arranged downstream of the heat exchanger 24, such that the heat exchanger 24 is arranged upstream of the heat exchanger 26. This means that the air flowing through the air pathway 22 firstly flows around the heat exchanger 24 and then the heat exchanger 26. The air flowing through the air pathway 22 can respectively at least be heated up by means of the respective heat exchanger 24 or 26. Here, it is conceivable that the air flowing through the air pathway 22 can be cooled by means of the heat exchanger 24, whereby the interior chamber can be cooled in line with demand.

Moreover, the air-conditioning device 10 comprises a valve device 28, by means of which at least one current, flowing through the respective circuit 12 or 14, of the respective medium can be influenced in particular at least with respect to its flow direction and preferably also with respect to its volume and/or mass current, i.e., can be set. To do so, the valve device 28 comprises several valve elements 30a-f, which are also referred to as valves. The respective valve element 30a-f, in particular formed as 3/2 way valve, has at least or exactly three ports 1, 2 and 3, which can function as an input and/or output. The respective medium can flow into the respective valve element 30a-f via the respective input, and the respective medium can flow out of the respective valve element 30a-f via the respective output. Preferably, it is provided that two of the ports 1, 2 and 3 are open, in particular constantly, and thus can be flowed through by the medium, while the respective third port 1, 2 or 3 is closed and thus cannot be flowed through by the medium.

Figure 2:
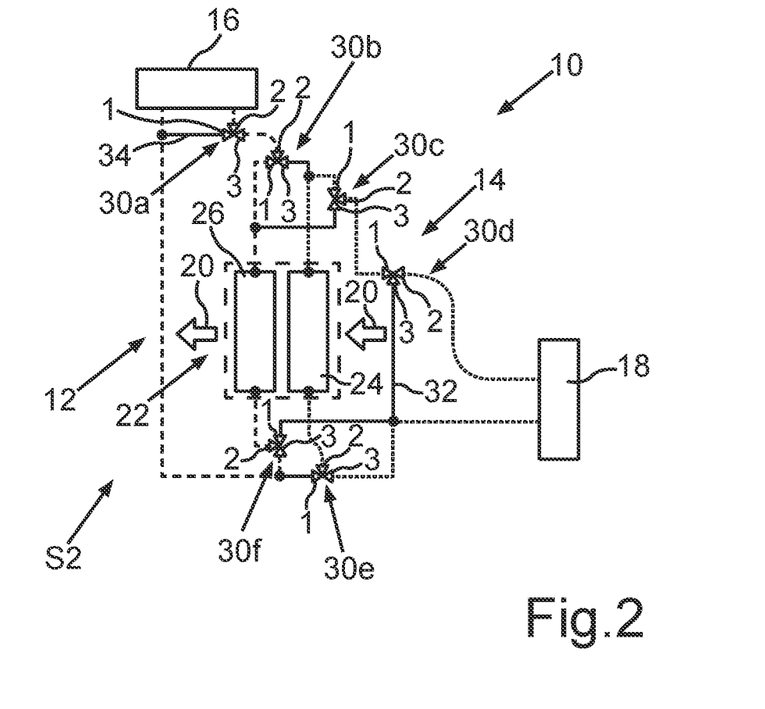
FIG. 2 is a schematic depiction of the air-conditioning device, wherein the valve device assumes its second switching state.

In order to now be able to air condition, in particular heat up, the interior chamber particularly efficiently and thus with a high degree of efficiency, the valve device 28 can be switched between a first switching state S1 shown in FIG. 1 and a second switching state S2 shown in FIG. 2, such that the valve device 28 has the switching states S1 and S2. In the first switching state S1, the first heat exchanger 24 is arranged in the first circuit 12, while the second heat exchanger 26 is arranged in the second circuit 14. Moreover, the circuits 12 and 14 are separated from each other in the first switching state S1, such that the first medium flows through the heat exchanger 24 and the second medium through the heat exchanger 26, and such that the media are not mixed with each other.

In the second switching state S2, the first heat exchanger 24 is arranged in the second circuit 14, while the second heat exchanger 26 is arranged in the first circuit 12. Moreover, the circuits 12 and 14 are also fluidically separated from each other in the second switching state S2, such that the media cannot mix together with one another and such that the second medium flows through the heat exchanger 24 and the first medium through the heat exchanger 26.

In order to implement the first switching state S1, the ports 2 and 3 of the valve 30a, the ports 2 and 3 of the valve 30b, the ports 2 and 3 of the valve element 30c, the ports 1 and 2 of the valve element 30d, the ports 1 and 2 of the valve element 30e and the ports 2 and 3 of the valve element 30f are open, while the port 1 of the valve element 30a, the port 1 of the valve element 30b, the port 1 of the valve element 30c, the port 3 of the valve element 30d, the port 3 of the valve element 30e and the port 1 of the valve element 30f are closed.

In order to implement the second switching state S2, the ports 2 and 3 of the valve element 30a, the ports 1 and 2 of the valve element 30b, the ports 1 and 2 of the valve element 30c, the ports 1 and 2 of the valve element 30d, the ports 2 and 3 of the valve element 30e and the ports 1 and 2 of the valve element 30f are open, while the port 1 of the valve element 30a, the port 3 of the valve element 30b, the port 3 of the valve element 30c, the port of the valve element 30d, the port 1 of the valve element 30e and the port 3 of the valve element 30f are closed.

If, for example, in the respective switching state S1 or S2 or in a different, further switching state, the port 2 of the valve element 30d is closed, while the ports 1 and 3 of the valve element 30d are open, then the component 18 is bypassed by the second medium, since the second medium then flows through a bypass line 32 bypassing the component 18. This means that the component 18 can be bypassed by at least one part of the second medium in such a way that the part of the second medium flows through the bypass line 32 and thus does not flow through the component 18.

The component 16 can also be bypassed by at least one part of the first medium via a bypass line 34 in such a way that at least the part of the first medium flows through the bypass line 34 and thus does not flow through the component 16. To do so, in the switching state S1 and/or in the second switching state S2 and/or in the other further switching state, the port 2 of the valve 30a is closed, while the ports 1 and 3 of the valve element 30a are open.

By means of the valve device 28, the circuits 12 and 14 formed, for example, as water circuits, by means of which lost heat provided by the components 16 and 18 can be used to heat up the interior chamber, can be coupled to each other and decoupled from each other in line with demand, such that the lost heat provided by the components 16 and 18 can also particularly advantageously be used to air condition, in particular heat up, the interior chamber when the components 16 and 18 work on low temperature levels and thus heat up the media to low temperature levels, i.e., to only low temperatures. Thus, the interior chamber can be heated efficiently and effectively and with low-loss.

A pump not depicted in the figures for conveying the respective medium can be arranged in the respective circuit 12 or 14. The circuits 12 and 14 can be coupled and decoupled from each other via the valves and the pump. Thus, both the current direction and volume flow of the media can be set in line with demand.

The heat sources shown in FIGS. 1 and 2 have, for example, temperature levels different from one another. The first heat source provides, for example, cheap energy on a lower temperature level. The second heat source provides, for example, expensive energy on any temperature level. The arrows 20 illustrate, for example, a cold air volume current of the air flowing through the air pathway 22, which is to be heated up, in particular by means of the heat exchangers 24 and 26.

The valves are set or switched in such a way that the first switching state S1 is set and the lost heat provided by the first heat source, which is energy from the first heat source, is emitted via the first heat exchanger 24 to the air for pre-heating. The pre-heated air is then brought to a target temperature by the second heat exchanger 26. Here, the second heat exchanger 26 is provided with energy or lost heat from the second heat source for heating up or heating the air. Each heat source can be connected to further heat sinks and/or heat sources.

Should, in a different operating state, the first heat source, for example, provide expensive energy on a higher temperature level and the second heat source provide cheap energy on a lower temperature level, then the valves can be switched, in order to thus set the second switching state S2. Then, the second heat exchanger 26 is provided with lost heat of the first heat source and the first heat exchanger 24 with lost heat of the second heat source.

Figure 3:
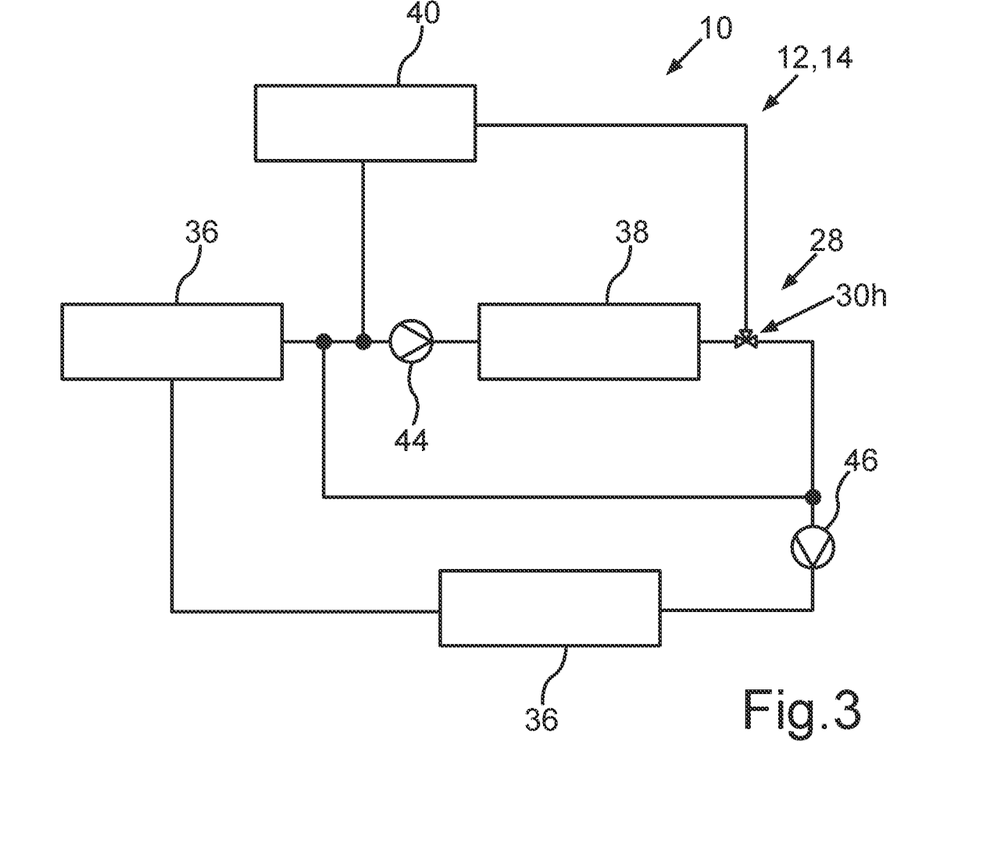
FIG. 3 is a further schematic depiction of the air-conditioning device.

FIG. 3 shows the air-conditioning device 10 in a further exemplary embodiment. Here, heat sources 36 and 38 and heat sinks 40 and 42 are arranged in the circuits 12 and 14, which the respective media can flow through. Moreover, the pumps mentioned above and labelled with 44 and 46 in FIG. 3 for conveying the media through the circuits 12 and 14 can be seen. Moreover, the valve device 28 has a valve element 30g simply referred to as a valve.

According to FIG. 3, the first heat source 36 provides cheap energy at a limited temperature level, and the heat source 38 provides expensive energy at any temperature level. The first heat sink 40 requires energy at a high temperature level, and the second heat sink 42 requires energy at a temperature level which is either below the temperature level of the heat source 36 or between the temperature level of the heat source 36 and the heat source 38. The interplay of the valve device 28 and the two pumps 44 and 46 ensures that the second heat sink 42 can use the energy from the heat source 36 completely and, in addition, obtains a low amount of the energy by means of the partial volume flow from the heat source 38. Here, the media or their volume flows are mixed with one another with a different temperature.

The invention claimed is:

1. An air-conditioning device (10) of a motor vehicle, comprising:
   a first circuit (12), wherein a first medium flows through the first circuit (12), wherein a first component (16) is disposed in the first circuit (12), and wherein the first medium is heatable by the first component (16);
   a second circuit (14), wherein a second medium flows through the second circuit (14), wherein a second component (18) is disposed in the second circuit (14), and wherein the second medium is heatable by the second component (18);

an air pathway (22), wherein air supplied to an interior chamber of the motor vehicle flows through the air pathway (22);

a first heat exchanger (24), wherein the first heat exchanger (24) is disposed in the air pathway (22), wherein the first heat exchanger (24) can be flowed around by the air flowing through the air pathway (22), and wherein the air flowing through the air pathway (22) is heatable by the first heat exchanger (24);

a second heat exchanger (26), wherein the second heat exchanger (26) is disposed in the air pathway (22) downstream of the first heat exchanger (24), wherein the second heat exchanger (26) can be flowed around by the air flowing through the air pathway (22), and wherein the air flowing through the air pathway (22) is heatable by the second heat exchanger (26); and a valve device (28), wherein via the valve device (28) a current flowing through the respective circuit (12, 14) of the respective medium can be influenced;

wherein the valve device (28) has:
- a first switching state (S1), in which the first heat exchanger (24) is disposed in the first circuit (12) and the second heat exchanger (26) is disposed in the second circuit (14); and
- a second switching state (S2), in which the first heat exchanger (24) is disposed in the second circuit (14) and the second heat exchanger (26) is disposed in the first circuit (12).

2. The air-conditioning device (10) according to claim 1, wherein the valve device (28) is formed to set a respective mass and/or volume flow of the respective current.

3. The air-conditioning device (10) according to claim 1 further comprising a cooling device, wherein via the cooling device at least one of the first and second mediums is cooled, wherein the air flowing through the air pathway (22) is cooled by the medium cooled by the cooling device in at least one of the first and second switching states (S1, S2) via at least one of the first and second heat exchangers (24, 26).

4. The air-conditioning device (10) according to claim 1, wherein at least one of the first and second components (16, 18) is an electrical component via which the motor vehicle can be electrically driven.

5. The air-conditioning device (10) according to claim 4, wherein the electrical component has an electrical engine for electrically driving the motor vehicle and/or an energy store formed to store electrical energy and/or a power electronics system and/or a fuel cell.

6. The air-conditioning device (10) according to claim 4, wherein the electrical component has an energy store and wherein at least one of the first and second mediums heats up the energy store.

7. The air-conditioning device (10) according to claim 1 further comprising a heat pump, wherein the heat pump removes heat from ambient air surrounding the air-conditioning device (10) and heats up at least one of the first and second mediums by the removed heat.

8. The air-conditioning device (10) according to claim 1 further comprising an electrical heating element, wherein the electrical heating element heats up at least one of the first and second mediums by using electrical energy.

9. The air-conditioning device (10) according to claim 1 further comprising a heating device, wherein the heating device heats up at least one of the first and second mediums by using a fossil fuel.

10. A motor vehicle, comprising:
the air-conditioning device (10) according to claim 1.

* * * * *